United States Patent
Kulkarni et al.

(10) Patent No.: US 11,763,017 B2
(45) Date of Patent: Sep. 19, 2023

(54) METHOD AND SYSTEM FOR PROACTIVE DATA PROTECTION OF VIRTUAL MACHINES

(71) Applicant: EMC IP Holding Company LLC, Hopkinton, MA (US)

(72) Inventors: Gururaj Kulkarni, Bangalore (IN); Anand Reddy, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 383 days.

(21) Appl. No.: 17/160,323

(22) Filed: Jan. 27, 2021

(65) Prior Publication Data
US 2022/0237310 A1 Jul. 28, 2022

(51) Int. Cl.
*G06F 21/62* (2013.01)
*G06F 9/455* (2018.01)
*G06F 21/64* (2013.01)

(52) U.S. Cl.
CPC ...... *G06F 21/6218* (2013.01); *G06F 9/45558* (2013.01); *G06F 21/64* (2013.01); *G06F 2009/45587* (2013.01); *G06F 2009/45591* (2013.01)

(58) Field of Classification Search
CPC .. G06F 21/6218; G06F 9/45558; G06F 21/64; G06F 2009/45587; G06F 2009/45591; G06F 21/53
See application file for complete search history.

(56) References Cited

U.S. PATENT DOCUMENTS

| | | | |
|---|---|---|---|
| 2014/0095868 A1* | 4/2014 | Korthny | G06F 21/64 713/165 |
| 2015/0339475 A1* | 11/2015 | Feroz | G06F 21/566 726/23 |

* cited by examiner

*Primary Examiner* — Bruce S Ashley
(74) *Attorney, Agent, or Firm* — Chamberlain, Hrdlicka, White, Williams & Aughtry

(57) ABSTRACT

A system for managing data protection of virtual machines (VMs) hosted by hosts of data clusters includes a data protection manager. The data protection manager identifies a data protection event associated with at least one VM, obtains, in response the data protection event, data protection rules and a protection policy associated with the at least one VM, spawn, by a monitoring engine orchestrator, a monitoring engine to the data cluster, initiates performance of the data protection services for the at least one VM using a first storage of storages, obtains, after the spawning, monitoring information from the monitoring engine, makes a determination that a data protection rule event of the data protection rule events occurred using the monitoring information, and in response to the determination, initiates the performance of a corrective action of corrective actions based on the data protection rules using a second storage of the storages.

20 Claims, 12 Drawing Sheets

METHOD AND SYSTEM FOR PROACTIVE DATA PROTECTION OF VIRTUAL MACHINES

BACKGROUND

Devices may generate information based on existing information. For example, devices may obtain information and derive information based on the obtained information. To obtain information, devices may be able to communicate with other devices. The communications between devices may be through any means.

SUMMARY

In one aspect, a system for managing data protection of virtual machines hosted by hosts of data clusters in accordance with one or more embodiments of the invention includes storages for storing data a data protection manager. The data protection manager identifies a data protection event associated with at least one virtual machine (VM) of a data cluster of the data clusters; obtains, in response the data protection event, data protection rules and a protection policy associated with the at least one VM; based on the data protection rules and a protection policy associated with the at least one VM: spawns, by a monitoring engine orchestrator of the data protection manager, at least one monitoring engine to the data cluster, where the monitoring engine monitors data protection services after it is spawned; initiates performance of the data protection services for the at least one VM using a first storage of the storages; obtains, after the deployment, monitoring information from the at least one monitoring engine; makes a determination that a data protection rule event of the data protection rule events occurred using the monitoring information; and in response to the determination: initiates the performance of a corrective action of corrective actions based on the data protection rules using a second storage of the storages.

In one aspect, a method for managing data protection of virtual machines hosted by hosts of data clusters in accordance with one or more embodiments of the invention includes identifying a data protection event associated with at least one virtual machine (VM) of a data cluster of the data clusters; obtaining, in response the data protection event, data protection rules and a protection policy associated with the at least one VM; based on the data protection rules and a protection policy associated with the at least one VM: spawning, by a monitoring engine orchestrator of the data protection manager, at least one monitoring engine to the data cluster, where the monitoring engine monitors data protection services after it is spawned; initiating performance of the data protection services for the at least one VM using a first storage of storages; obtaining, after the deployment, monitoring information from the at least one monitoring engine; making a determination that a data protection rule event of the data protection rule events occurred using the monitoring information; and in response to the determination: initiating the performance of a corrective action of corrective actions based on the data protection rules using a second storage of the storage.

In one aspect, a non-transitory computer readable medium in accordance with one or more embodiments of the invention includes computer readable program code, which when executed by a computer processor enables the computer processor to perform a method for managing data protection of virtual machines hosted by hosts of data clusters in accordance with one or more embodiments of the invention.

The method includes identifying a data protection event associated with at least one virtual machine (VM) of a data cluster of the data clusters; obtaining, in response the data protection event, data protection rules and a protection policy associated with the at least one VM; based on the data protection rules and a protection policy associated with the at least one VM: spawning, by a monitoring engine orchestrator of the data protection manager, at least one monitoring engine to the data cluster, where the monitoring engine monitors data protection services after it is spawned; initiating performance of the data protection services for the at least one VM using a first storage of storages; obtaining, after the deployment, monitoring information from the at least one monitoring engine; making a determination that a data protection rule event of the data protection rule events occurred using the monitoring information; and in response to the determination: initiating the performance of a corrective action of corrective actions based on the data protection rules using a second storage of the storages.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
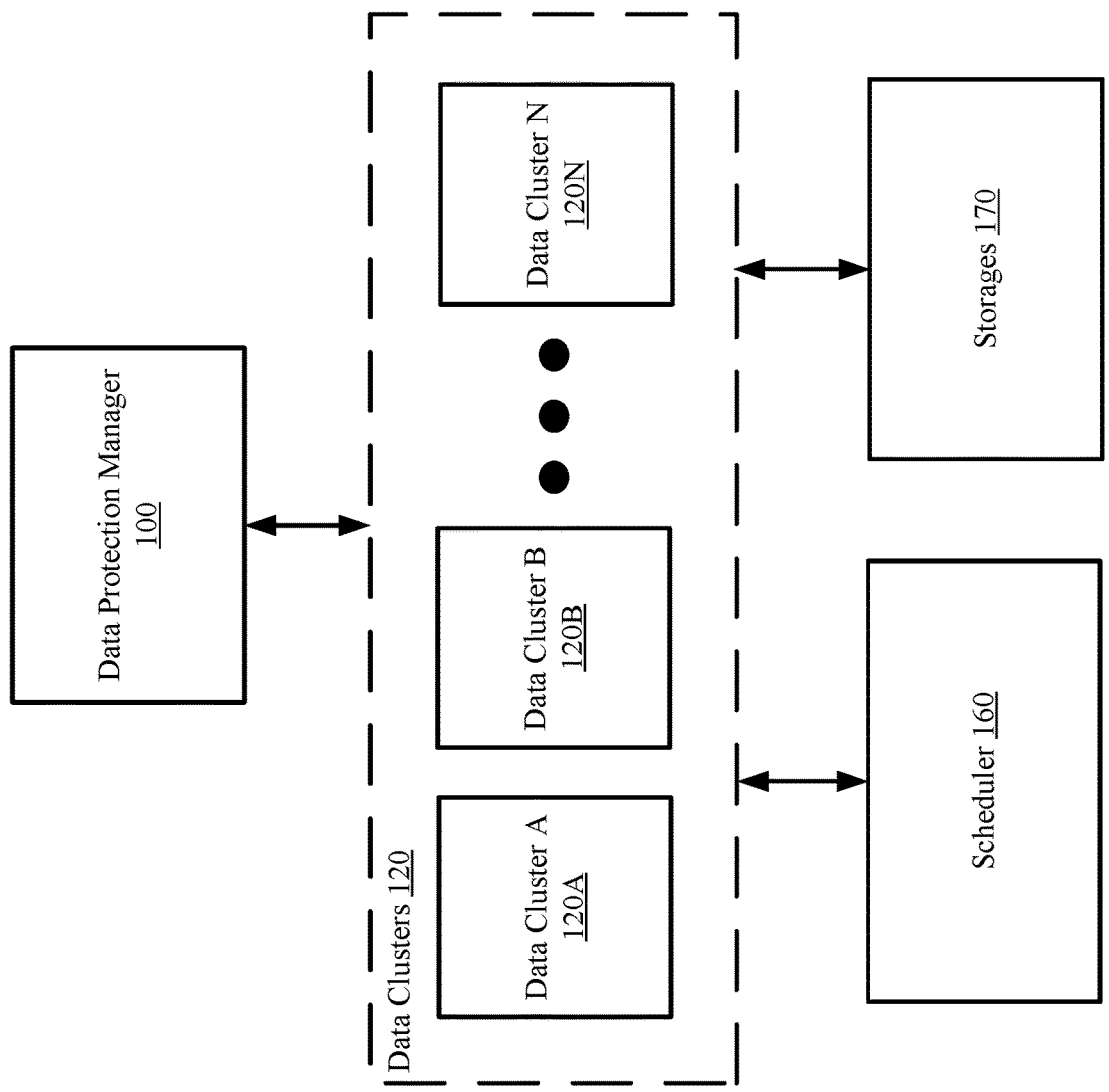
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for proactively providing data protection services for virtual machines hosted by hosts of data clusters. More specifically, embodiments of the invention relate to generating data protection rules based on protection policies associated with virtual machines and generating monitoring engines that generate monitoring information associated with the performance of data protection services for virtual machines. A data protection manager may use the data protection rules and the monitoring information to identify data protection rule events associated with the performance of data protection services for virtual machines. The data protection manager may initiate the performance of corrective actions based on the data protection rule events using the data protection rules. This may enable the data protection manager to efficiently manage the performance of data protection services for virtual machines, and improve the reliability of the data protection services.

FIG. 1A shows a diagram of a system in accordance with one or more embodiments of the invention. The system may include a data protection manager (100), data clusters (120), a scheduler (160), and storages (170). The system may include one or more data clusters (120), e.g., data cluster A (120A), data cluster B (120B), and data cluster N (120N). The system may include additional, fewer, and/or different components without departing from the invention. Each component may be operably connected to any of the other components via any combination of wired and/or wireless connections. Each of the aforementioned components is discussed below.

In one or more embodiments of the invention, the data protection manager (100) includes the functionality to provide data protection management services to virtual machines executing on hosts (both discussed below) of the data clusters (120). The data protection management services may include (i) generating data protection rules (discussed below) based on protection policies, (ii) deploying monitoring engines to monitor the performance of the data protection services, (iii) initiating the performance of data protection services, and (iv) modifying the performance of data protection services based on the data protection rules and monitoring information obtained from the monitoring engines. The data protection manager (100) may include the functionality to provide other and/or additional services without departing from the invention. For additional information regarding the data protection manager (100), refer to FIG. 1F. The data protection manager (100) may include the functionality to perform the methods of FIGS. 3A-3C.

Figure 5:
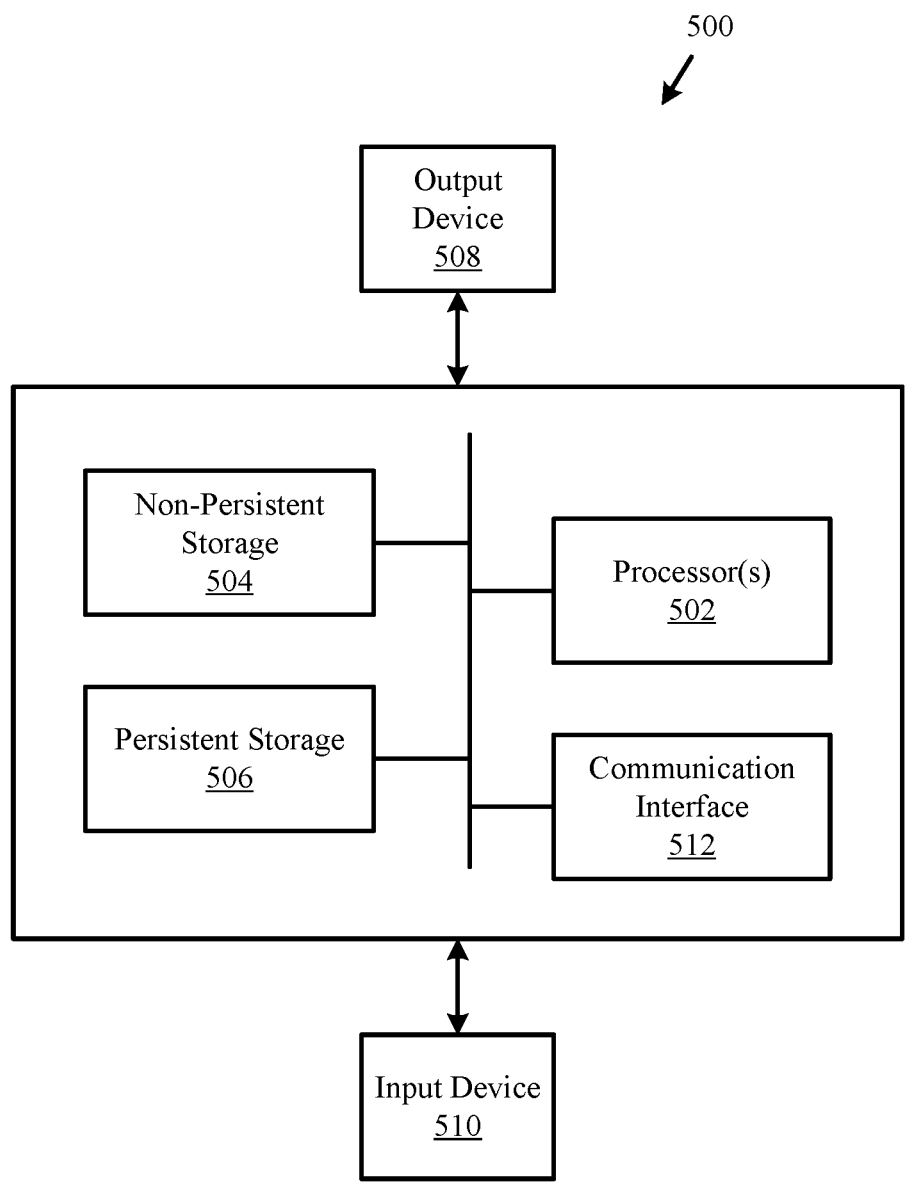
FIG. 5 shows a diagram of a computing device in accordance with one or more embodiments of the invention.

In one or more embodiments of the invention, the data protection manager (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (100) described throughout this application.

In one or more embodiments of the invention, the data protection manager (100) is implemented as a logical device. The logical device may utilize the computing resources of any number of computing devices and thereby provide the functionality of the data protection manager (100) described throughout this application.

In one or more embodiments of the invention, the data clusters (120) include hosts that host virtual machines. The data clusters (120) may include any number of components that may be used to host the virtual machines. Hosting virtual machines may result in the generation of data that may be important to the user. The data clusters (120) obtain data protection management services from the data protection manager (100) in order to protect the aforementioned data. For additional information regarding the data clusters (120) refer to FIGS. 1B-1D.

In one or more embodiments of the invention, the scheduler (160) includes the functionality to provide workload allocation services to the data clusters (120) and the storages (170). The workload allocation services may include allocating components of the data clusters (120) and the storages (170) to perform workloads. The workloads may include hosting virtual machines, providing data protection services, storing data, and/or other and/or additional types of workloads without departing from the invention. The scheduler (160) may allocate and/or reallocate, after allocating, components of the data clusters (120) and the storages (170) to perform workloads based on requests obtained from the data protection manager (100), monitoring engines (discussed below), and/or users of the system. The scheduler (160) may also generate monitoring information and provide the monitoring information to the monitoring engines. The scheduler (160) may include the functionality to provide other and/or additional services without departing from the invention.

In one or more embodiments of the invention, the scheduler (160) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the scheduler (160) described throughout this application.

In one or more embodiments of the invention, the scheduler (160) is implemented as a logical device. The logical device may utilize the computing resources of any number of computing devices and thereby provide the functionality of the scheduler (160) described throughout this application.

In one or more embodiments of the invention, the storages (170) include the functionality to store data. The data may be backups of virtual machines executing on the data clusters (120). The storages (170) may store other data without departing from the invention. The storages (170) may include any number of storage devices for storing data without departing from the invention. The storages (170) may provide and obtain data to and from the data clusters (120), the data protection manager (100), the scheduler (160), and other and/or additional components not included in the system illustrated in FIG. 1A without departing from the invention. The storages (170) may obtain requests to perform data storage workloads from the scheduler (160). The storages may include other and/or additional functionalities without departing from the invention.

In one or more embodiments of the invention, the storages (170) are implemented as computing devices (see e.g., FIG. 5). The computing devices may be, for example, a laptop computer, a desktop computer, a server, a distributed computing system, or a cloud resource (e.g., a third-party storage system accessible via a wired or wireless connection). The computing devices may include one or more processors, memory (e.g., random access memory), and persistent storage (e.g., disk drives, solid state drives, etc.). The computing devices may include instructions, stored on the persistent storage, that when executed by the processor(s) of the computing devices cause the computing devices to perform the functionality of the storages (170) described throughout this application.

In one or more embodiments of the invention, the storages (170) are implemented as logical devices. The logical devices may utilize the computing resources of any number of computing devices and thereby provide the functionality of the storages (170) described throughout this application.

Figure 1B:
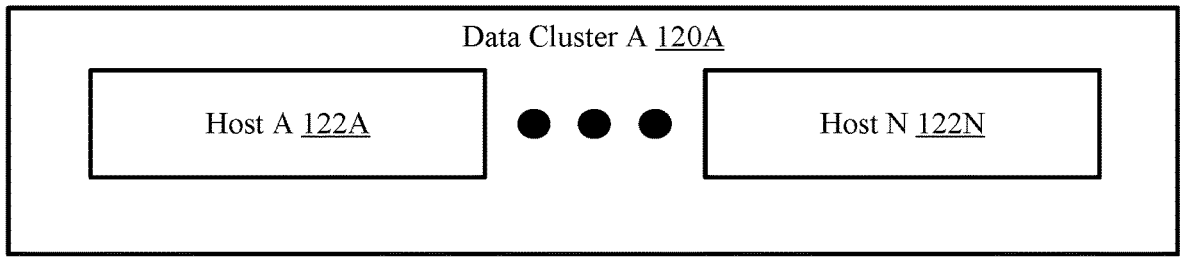
FIG. 1B shows a diagram of a data cluster in accordance with one or more embodiments of the invention.
Figure 1C:
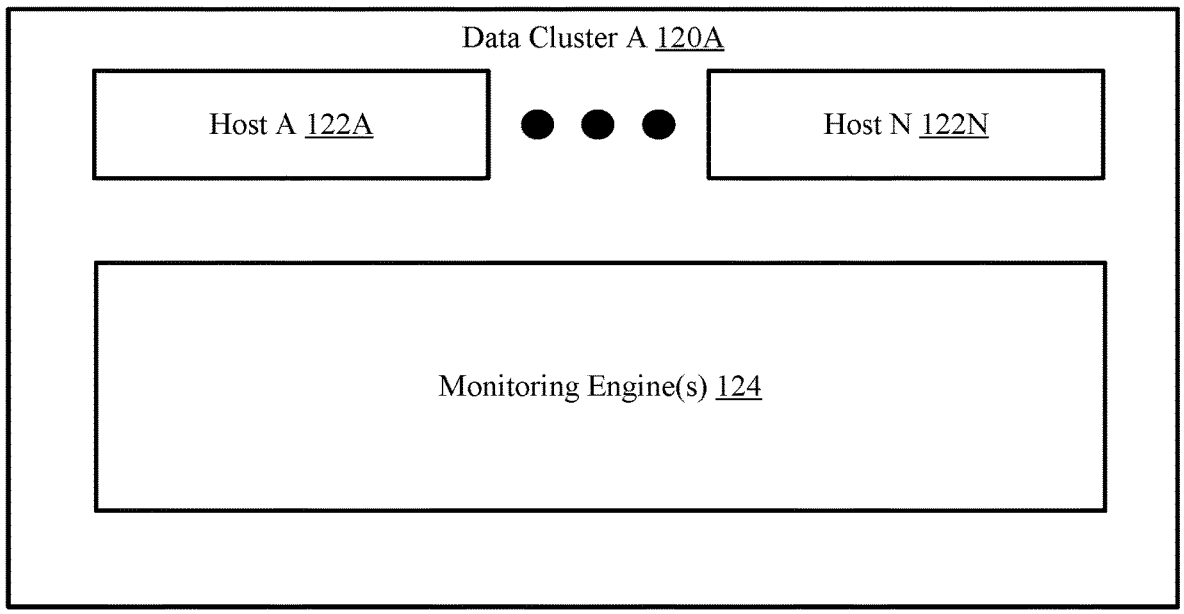
FIG. 1C shows a diagram of a data cluster with a monitoring engine in accordance with one or more embodiments of the invention.
Figure 1D:
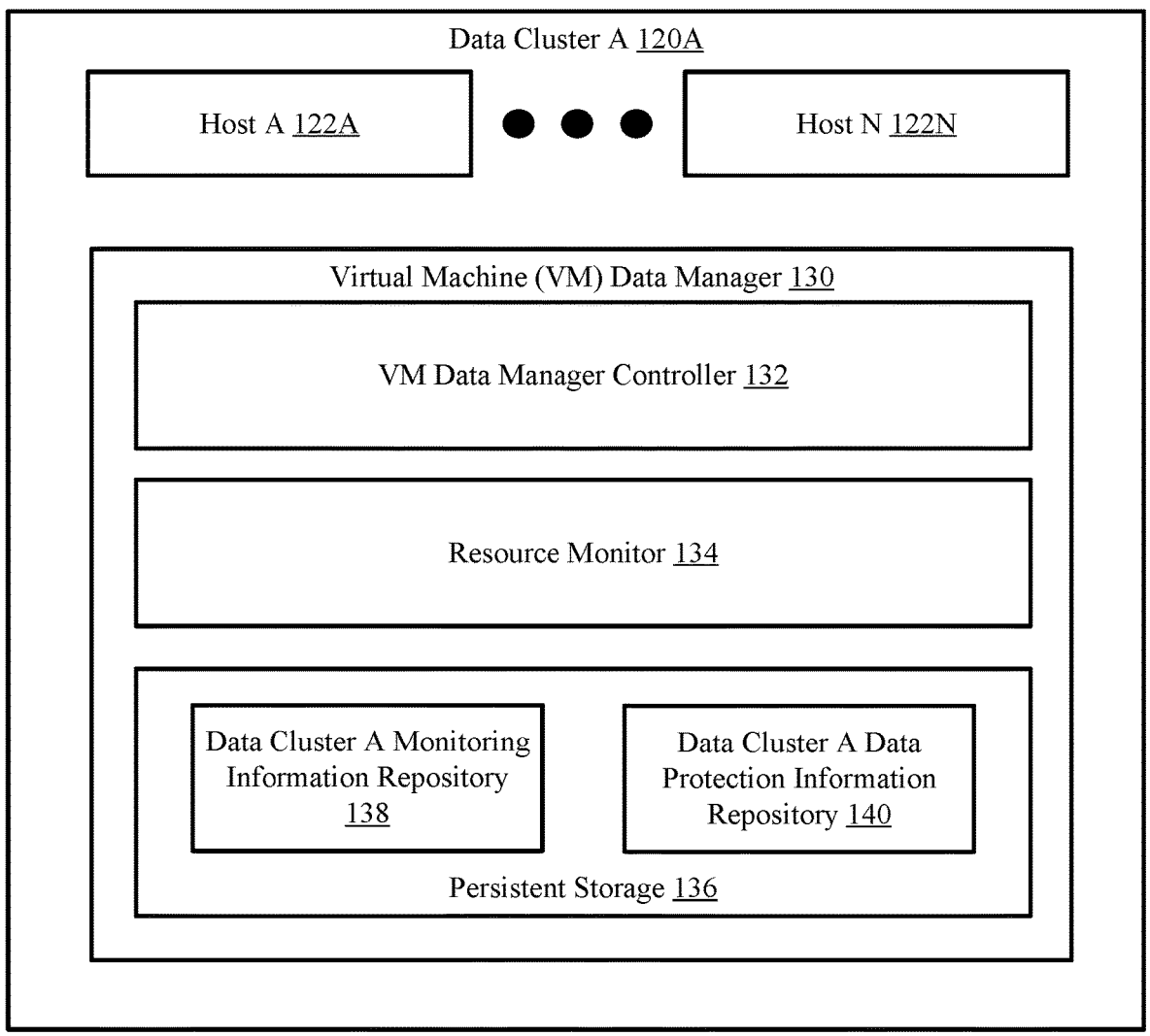
FIG. 1D shows a diagram of a data cluster with a virtual machine data manager in accordance with one or more embodiments of the invention.

FIGS. 1B-1D show diagrams of embodiments of a data cluster (e.g., data cluster A (120A, FIG. 1A)). The data clusters (120, FIG. 1A) may include any combination of embodiments of data clusters as depicted in FIGS. 1B-1D without departing from the invention. Additionally, the data clusters (120, FIG. 1A) include any combination of components as the embodiments of the data clusters depicted in FIGS. 1B-1D. For example, data cluster A (120A, FIG. 1A) may include hosts, a virtual machine data manager, monitoring engines, and/or any combination of the aforementioned components (discussed below) without departing from the invention.

Turning to FIG. 1B, FIG. 1B shows a diagram of a data cluster in accordance with one or more embodiments of the invention. The data cluster (e.g., 120A) may be an embodiment of the one or more of the data clusters of FIG. 1A (e.g., data cluster A (120A), data cluster B (120B), and/or data cluster N (120N)) discussed above. Data cluster A (120A) may include one or more hosts, e.g., host A (122A) and host N (122N), that host virtual machines.

In one or more embodiments of the invention, the hosts (122A, 122N) provide services to clients (not shown) and perform data protection services for virtual machines hosted by the hosts (122A, 122N). For additional information regarding hosts, refer to FIG. 1E.

In one or more embodiments of the invention, each of the hosts (e.g., 122A) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a host (e.g., 122A) described throughout this application.

In one or more embodiments of the invention, each of the hosts (e.g., 122A) is implemented as a logical device. The logical device may utilize the computing resources of any number of computing devices and thereby provide the functionality of the host (e.g., 122A) described throughout this application.

FIG. 1C shows a diagram of a data cluster with a monitoring engine in accordance with one or more embodiments of the invention. The data cluster (e.g., 120A) may be an embodiment of the one or more of the data clusters of FIG. 1A (e.g., data cluster A (120A), data cluster B (120B), and/or data cluster N (120N)) discussed above. Data cluster A (120A) may include one or more hosts, e.g., host A (122A) and host N (122N), that host virtual machines. For additional information regarding the hosts, refer to FIG. 1E. Data cluster A (120A) may also include monitoring engine(s) (124). The monitoring engine(s) (124) may include one or more monitoring engines (not shown). The monitoring engine(s) (124) may include the functionality to (i) initiate the performance of monitoring data protection services based on rules associated with protection policies, (ii) monitor the performance of data protection services for virtual machines hosted by the hosts (122A, 122N), (iii) generate and/or obtain monitoring information and provide the monitoring information to the data protection manager (100, FIG. 1A), and (iv) initiate the performance of corrective actions based on requests from the data protection manager (100, FIG. 1A). The monitoring engine(s) (124) may include other and/or additional functionalities without departing from the invention.

In one or more embodiments of the invention, the monitoring engine(s) (124) are containers spawned by the monitoring engine orchestrator. Spawning a monitoring engine may refer to (i) instantiating a monitoring engine from a monitoring engine image included on the data protection manager (100) or in a data cluster (e.g., 120A, FIG. 1A) and/or (ii) generating a monitoring engine and deploying the monitoring engine to a host (e.g., 122A). A container may refer to a collection of software (i.e., computer instructions, libraries, etc.), which when executed by a processor of a host (e.g., 122A) of data cluster A (120A), cause the host (e.g., 122A) to provide the functionality of the monitoring engine(s) (124) described throughout this application. The monitoring engine(s) (124) may require a lower amount of computing and storage resources to perform the aforementioned functionality compared to VMs. Therefore, monitoring engines (124) may be spawned with minimal impact on the efficiency of data cluster A (120A) or components thereof.

FIG. 1D shows a diagram of a data cluster with a virtual machine data manager in accordance with one or more embodiments of the invention. The data cluster (e.g., 120A) may be an embodiment of the one or more of the data clusters of FIG. 1A (e.g., data cluster A (120A), data cluster B (120B), and/or data cluster N (120N)) discussed above. Data cluster A (120A) may include one or more hosts, e.g., host A (122A) and host N (122N), that host virtual machines. For additional information regarding hosts (e.g., 122A, 122N), refer to FIG. 1E. Data cluster A (120A) may also include a virtual machine (VM) data manager (130), which may provide data protection services for the virtual machines hosted by the hosts (122A, 122N) of data cluster A (120A). Data cluster A (120A) may include fewer, different, and/or additional components without departing from the invention.

In one or more embodiments of the invention, the VM data manager (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the VM data manager (130) described throughout this application.

In one or more embodiments of the invention, the VM data manager (130) is implemented as a logical device. The logical device may utilize the computing resources of any number of computing devices (e.g., hosts (122A, 122N)) and thereby provide the functionality of the VM data manager (130) described throughout this application.

The VM data manager (130) may include a VM data manager controller (132), a resource monitor (134), and persistent storage (136). The VM data manager (130) may include fewer, additional, and/or different components without departing from the invention. Each of the aforementioned components of the VM data manager (130) is discussed below.

In one or more embodiments of the invention, the VM data manager controller (132) includes the functionality to perform the data protection services of the VM data manager (130). The data protection services may include initiating the generation of backups of virtual machines, storing backups in storages (170, FIG. 1A), obtaining data protection request from the data protection manager (100, FIG. 1A), maintaining a data cluster A data protection information repository (discussed below), and performing corrective actions based on requests from monitoring engines (124, FIG. 1C) and/or the data protection manager (100, FIG. 1A). The VM data manager controller (132) may include other and/or additional functionalities without departing from the invention.

In one or more embodiments of the invention, the VM data manager controller (132) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the VM data manager controller (132) described throughout this application.

In one or more embodiments of the invention, the VM data manager controller (132) is implemented as computer instructions, e.g., computer code, stored on a persistent storage that when executed by a processor of the VM data manager (130) or a host (e.g., 122A) causes the VM data manager (130) or the host (e.g., 122A) to provide the functionality of the VM data manager controller (132) described throughout this application.

In one or more embodiments of the invention, the resource monitor (134) includes the functionality to monitor the operation of the VM data manager (130). The resource monitor (134) may generate monitoring information associated with the performance of data protection services by the VM data manager (130). The resource monitor (134) may provide the monitoring information to the monitoring engines (124, FIG. 1C). The resource monitor (134) may include other and/or additional functionalities without departing from the invention.

In one or more embodiments of the invention, the resource monitor (134) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the resource monitor (134) described throughout this application.

In one or more embodiments of the invention, the resource monitor (134) is implemented as computer instructions, e.g., computer code, stored on a persistent storage that when executed by a processor of the VM data manager (130) or a host (e.g., 122A) causes the VM data manager (130) or the host (e.g., 122A) to provide the functionality of the resource monitor (134) described throughout this application.

In one or more embodiments of the invention, the persistent storage (136) stores data. The data stored in persistent storage (136) may include monitoring information and data protection information. The persistent storage (136) may include other and/or additional data without departing from the invention. The persistent storage (133) may include a data cluster A monitoring information repository (138) and a data cluster A data protection information repository (140). Each of these data structures is discussed below.

In one or more embodiments of the invention, the data cluster A monitoring information repository (138) includes one or more data structures that include monitoring information associated with the performance of data protection services for virtual machines hosted by the hosts (e.g., 122A, 122N). The data cluster A monitoring information repository (138) may include monitoring entries. Each monitoring entry may include monitoring information associated with the performance of data protection services for a virtual machine hosted by the hosts (e.g., 122A, 122N). The monitoring information may include performance characteristics associated with the performance of the data protection services. The performance characteristics may include for example, storage utilization, storage availability, network bandwidth, CPU utilization, times of performances of particular data protection services, and other and/or additional performance characteristics without departing from the invention. The data cluster A monitoring information repository (138) may be maintained by the monitoring engines (124, FIG. 1C) discussed above. The monitoring information included in the data cluster A monitoring information repository (138) may be provided to the data protection manager (100, FIG. 1A) by the monitoring engines (124, FIG. 1C), and may be used by the data protection manager (100, FIG. 1A) to identify the occurrence of data protection rule events of data protection rules associated with the monitoring information and to initiate the performance of corrective actions. The data cluster A monitoring information repository (138) may include other and/or additional information and may be used for other and/or additional purposes without departing from the invention.

Additionally, the monitoring information may include infrastructure information. The infrastructure information may be information associated with the components of the system. The infrastructure information may include, for example, network availability and usage throughout the system, processor usage (e.g., what data protection services are using a CPU/portion of a CPU) and availability of central processing units (CPUs) of hosts (e.g., 122A, FIG. 1B) and VM data managers (e.g., 130, FIG. 1D) of the system, storage usage and availability of persistent storages of hosts (e.g., 122A, FIG. 1B), VM data managers (e.g., 130, FIG. 1D), storage(s) (170, FIG. 1A) of the system, and other and/or additional information regarding the usage and availability of components in the system without departing from the invention. The infrastructure information may be obtained from and/or updated by monitoring engines (e.g., 124, FIG. 1C) and/or the scheduler (160, FIG. 1A). The infrastructure information may be used by the analytical engine to determine the performance of corrective actions and what components perform the corrective actions to intelligently select components that are available to efficiently perform the corrective actions.

In one or more embodiments of the invention, the data cluster A data protection information repository (140) includes one or more data structures that include virtual machine entries. Each virtual machine entry may include data protection information associated with a virtual machine hosted by the hosts (e.g., 122A, 122N). The data protection information may include, for example, virtual machine identifiers (e.g., a unique, global combination of bits associated with the VM), host identifiers (e.g., a unique, global combination of bits associated with the host that hosts the VM), backup identifiers (e.g., a unique, global combination of bits associated with a backup of the virtual machine), backup storage locations (e.g., the storage device of the storages (170, FIG. 1A) in which a backup of the VM is stored), backup timestamps (e.g., a point in time in which a backup was generated), and other and/or additional data protection information associated with the virtual machine. The data cluster A data protection information repository (140) may be maintained by the VM data manager controller (132) during the performance of data protection services for virtual machines. The data cluster A data protection information repository may be used by the VM data manager controller to perform data protection services such as the restoration of a virtual machine. The data cluster A data protection information repository (140) may include other and/or additional information and may be used for other and/or additional purposes without departing from the invention.

The persistent storage (136) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (136) may utilize portions of any combination of hard disk drives, solid state disk drives, tape drives, and/or any other physical storage medium of any number of computing devices.

Figure 1E:
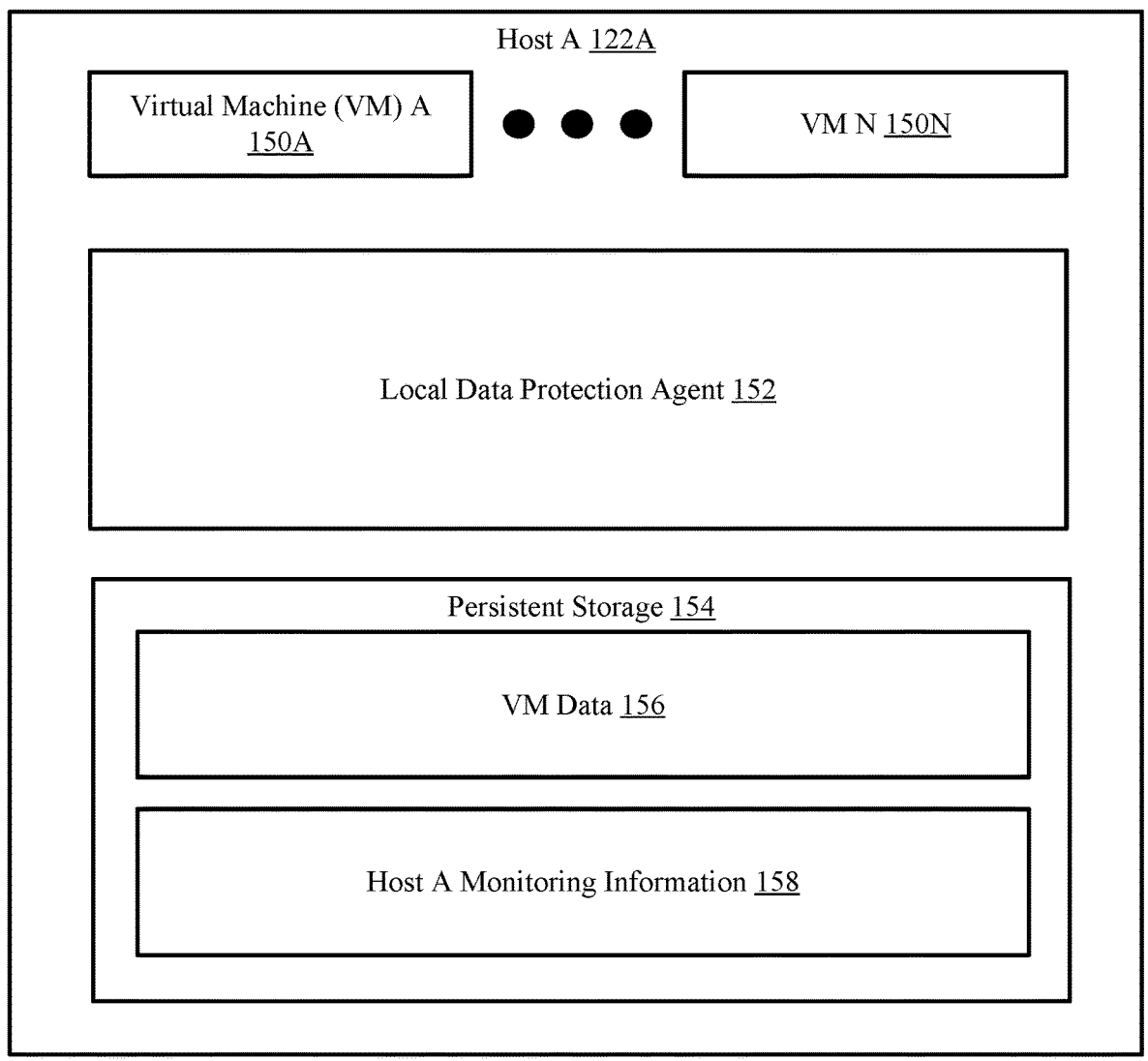
FIG. 1E shows a diagram of a host in accordance with one or more embodiments of the invention.

FIG. 1E shows a diagram of a host in accordance with one or more embodiments of the invention. The host (122A) may be an embodiment of the hosts (122A, 122N, FIGS. 1B-1D) discussed above. As discussed above, host A (122A) hosts virtual machines (VMs) (150A, 150N). Host A (122A) may host any number of virtual machines, e.g., VM A (150A) and VM N (150N). The VMs (150A, 150N) may be logical entities executed using computing resources (not shown) of host A (122A). Each of the virtual machines (150A, 150N) may be performing similar or different processes. In one or more embodiments of the invention, the VMs (150A, 150N) provide services to users, e.g., clients (not shown). For example, the VMs (150A, 150N) may host components. The components may be, for example, instances of databases, email servers, and/or other applications. The VMs (150A, 150N) may host other types of components without departing from the invention. Host A (122A) may also include a local data protection agent (152) and persistent storage (154) (discussed below). Host A (122A) may include other and/or additional components without departing from the invention.

In one or more embodiments of the invention, the local data protection agent (152) provides local data protection services to the VMs (150A, 150N). The local data protection services may include (i) obtaining data protection requests from a VM data manager (130, FIG. 1D), (ii) generating backups of VM data (discussed below), (iii) providing backups to a VM data manager (130, FIG. 1D), and (iv) restoring VMs (150A, 150N). The local data protection services may include other and/or services without departing from the invention. The local data protection agent (152) may include other and/or additional functionalities without departing from the invention.

In one or more embodiments of the invention, the local data protection agent (152) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the local data protection agent (152) described throughout this application.

In one or more embodiments of the invention, the local data protection agent (152) is implemented as computer instructions, e.g., computer code, stored on a persistent storage that when executed by a processor of the host A (122A) causes host A (122A) to provide the functionality of the local data protection agent (152) described throughout this application.

In one or more embodiments of the invention, the persistent storage (154) stores data. The data stored in persistent storage (154) may include VM data (156) and host A monitoring information (158). The persistent storage (154) may include other and/or additional data without departing from the invention. Each of these data structures is discussed below.

In one or more embodiments of the invention, the VM data (156) may be one or more data structures that include data generated by the VMs (150A, 150N) while providing services to users. The VM data (156) may include, for example, email data, database data, and other and/or additional types of data generated by VMs (150A, 150N) without departing from the invention. The VM data (156) may be used by the VMs (150A, 150N) to provide the services to users. The VM data (156) may be important to users.

Therefore, the VM data (156) may be backed up through the data protection services mentioned throughout this application.

In one or more embodiments of the invention, the host A monitoring information (158) includes one or more data structures that includes monitoring information associated with the performance of data protection services for the VMs (150A, 150N). The host A monitoring information may be an embodiment of the monitoring information included in the data cluster A monitoring information repository (138, FIG. 1D). For additional information regarding host A monitoring information (158), refer to FIG. 1D.

The persistent storage (154) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (154) may utilize portions of any combination of hard disk drives, solid state disk drives, tape drives, and/or any other physical storage medium of any number of computing devices.

Figure 1F:
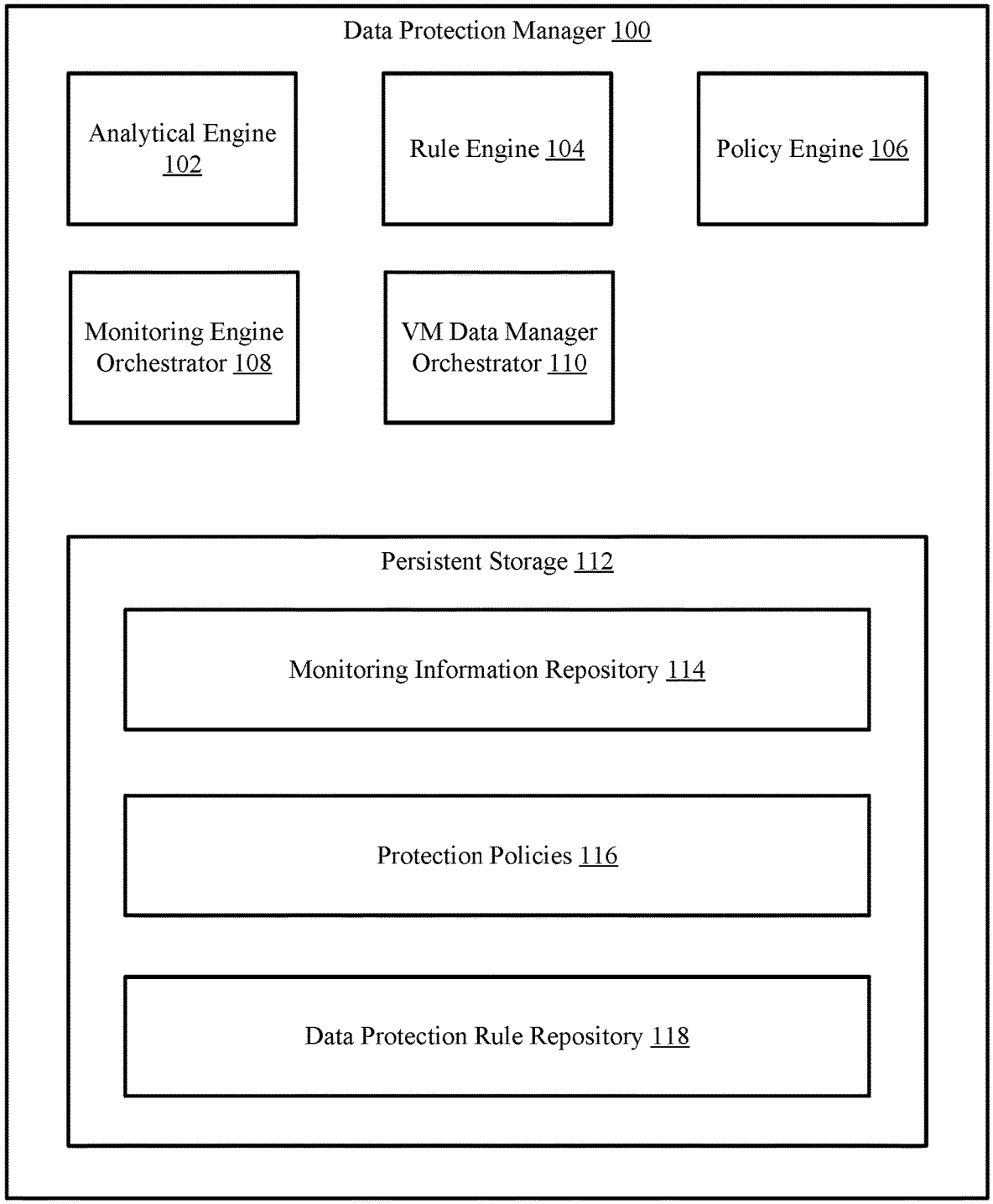
FIG. 1F shows a diagram of a data protection manager in accordance with one or more embodiments of the invention.

FIG. 1F shows a diagram of a data protection manager in accordance with one or more embodiments of the invention. The data protection manager (100) may be an embodiment of the data protection manager (100, FIG. 1A) discussed above. The data protection manager (100) may include an analytical engine (102), a rule engine (104), a policy engine (106), a monitoring engine orchestrator (108), a VM data manager orchestrator (110), and persistent storage (112). The data protection manager (100) may include additional, fewer, or different components without departing from the invention. Each of the aforementioned components is discussed below.

In one or more embodiments of the invention, the analytical engine (102) includes the functionality to use monitoring information and data protection rules to determine if data protection rule events have occurred. The analytical engine (102) may compare monitoring information and data protection rules associated with a VM (e.g., 150A, 150N, FIG. 1E) and determine whether the monitoring information indicates the occurrence of a data protection rule event. The analytical engine (102) may also use the data protection rules to identify corrective actions associated with data protection rule events. The analytical engine (102) may also identify available components of the system to efficiently perform all and/or a portion of the corrective actions based on infrastructure information included in the monitoring information. The analytical engine (102) may also initiate the performance of corrective actions on the identified components. To provide the aforementioned functionalities, the analytical engine (102) may obtain monitoring information from monitoring engines (e.g., 124, FIG. 1C) and send corrective action requests to monitoring engines (e.g., 124, FIG. 1C). The analytical engine (102) may include other and/or additional functionalities without departing from the invention.

In one or more embodiments of the invention, the analytical engine (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the analytical engine (102) described throughout this application.

In one or more embodiments of the invention, the analytical engine (102) is implemented as computer instructions, e.g., computer code, stored on a persistent storage that when executed by a processor of the data protection manager (100) causes the data protection manager (100) to provide the functionality of the analytical engine (102) described throughout this application.

In one or more embodiments of the invention, the rule engine (104) maintains the data protection rule repository (118, discussed below). The rules engine (104) may generate data protection rules of the data protection rule repository for performing data protection services for VMs (e.g., 150A, 150N, FIG. 1E) using one or more protection policies associated with the VMs (e.g., 150A, 150N, FIG. 1E) and data protection information. The rule engine (104) may obtain protection policies from the policy engine (106). The rule engine (104) may include other and/or additional functionalities without departing from the invention.

In one or more embodiments of the invention, the rule engine (104) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the rule engine (104) described throughout this application.

In one or more embodiments of the invention, the rule engine (104) is implemented as computer instructions, e.g., computer code, stored on a persistent storage that when executed by a processor of the data protection manager (100) causes the data protection manager (100) to provide the functionality of the rule engine (104) described throughout this application.

In one or more embodiments of the invention, the policy engine (106) may maintain protection policies (116) associated with VMs (e.g., 150A, 150N, FIG. 1E). The policy engine may obtain protection policies (116) from users of the system and/or other components of the system of FIG. 1A. The policy engine (106) may provide protection policies (116) to the rule engine (104) to generate data protection rules associated with the protection policies (116). The policy engine (106) may include other and/or additional functionalities without departing from the invention.

In one or more embodiments of the invention, the policy engine (106) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the policy engine (106) described throughout this application.

In one or more embodiments of the invention, the policy engine (106) is implemented as computer instructions, e.g., computer code, stored on a persistent storage that when executed by a processor of the data protection manager (100) causes the data protection manager (100) to provide the functionality of the policy engine (106) described throughout this application.

In one or more embodiments of the invention, the monitoring engine orchestrator (108 spawns monitoring engines (e.g., 124, FIG. 1C) to data clusters (120, FIG. 1A) based on data protection rules and protection policies. The monitoring engine orchestrator (108) may specify the performance characteristics and the components of the system which the monitoring engines (e.g., 124, FIG. 1C) measure in order to generate associated monitoring information, and instantiate the monitoring engines (e.g., 124, FIG. 1C) in data clusters (120, FIG. 1A). The monitoring engine orchestrator (108) may include other and/or additional functionalities without departing from the invention.

In one or more embodiments of the invention, the monitoring engine orchestrator (108) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the monitoring engine orchestrator (108) described throughout this application.

In one or more embodiments of the invention, the monitoring engine orchestrator (108) is implemented as computer instructions, e.g., computer code, stored on a persistent storage that when executed by a processor of the data protection manager (100) causes the data protection manager (100) to provide the functionality of the monitoring engine orchestrator (108) described throughout this application.

In one or more embodiments of the invention, the VM data manager orchestrator (110) may initiate the performance of data protection services by VM data managers (e.g., 130, FIG. 1E) based on protection policies. The VM data manager orchestrator (110) may send data protection requests to VM data managers (e.g., 130, FIG. 1E) to perform data protection services. The VM data manager orchestrator (110) may monitor protection policies (116) and initiate data protection services based on the protection policies (116). The VM data manager orchestrator (110) may include other and/or additional functionalities without departing from the invention.

In one or more embodiments of the invention, the VM data manager orchestrator (110) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the VM data manager orchestrator (110) described throughout this application.

In one or more embodiments of the invention, the VM data manager orchestrator (110) is implemented as computer instructions, e.g., computer code, stored on a persistent storage that when executed by a processor of the data protection manager (100) causes the data protection manager (100) to provide the functionality of the VM data manager orchestrator (110) described throughout this application.

In one or more embodiments of the invention, the persistent storage (112) stores data. The data stored in persistent storage (112) may include a monitoring information repository (114), protection policies (116), and a data protection rule repository (118). The persistent storage (112) may include other and/or additional data without departing from the invention. Each of these data structures is discussed below.

In one or more embodiments of the invention, the monitoring information repository (114) is one or more data structures that include monitoring information associated with the performance of data protection services for VMs (e.g., 150A, 150N, FIG. 1E) obtained from monitoring engines (e.g., 124, FIG. 1C). The monitoring information may be an embodiment of the monitoring information discussed above in FIG. 1D. For more information regarding monitoring information, refer to FIG. 1D.

In one or more embodiments of the invention, the protection policies (116) are one or more data structures that include protection policies associated with VMs (150A, 150N, FIG. 1E) included in the system. Each protection policy may specify one or more data protection requirements for providing data protection services for the associated VM (e.g., 150A, FIG. 1E). A data protection requirement may include, for example, a storage location to store backups, a schedule for generated backups, time requirements for performing data protection services, and other and or additional types of data protection requirements without departing from the invention. The protection policies (116) may be maintained by the policy engine (106), and used by the rule engine (104) to generate data protection rules and the VM data manager orchestrator (110) to perform data protection services. The protection policies (116) may include other and/or additional information and may be used for other and/or additional purposes without departing from the invention.

In one or more embodiments of the invention, the data protection rule repository (118) includes one or more data structures that include data protection rules associated with protection policies (116). The data protection rules may be used by the analytical engine (102) to determine the occurrence of data protection rule event and to perform the associated corrective actions. For additional information regarding the data protection rule repository (118), refer to FIG. 2.

The persistent storage (112) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (112) may utilize portions of any combination of hard disk drives, solid state disk drives, tape drives, and/or any other physical storage medium of any number of computing devices.

Figure 2:
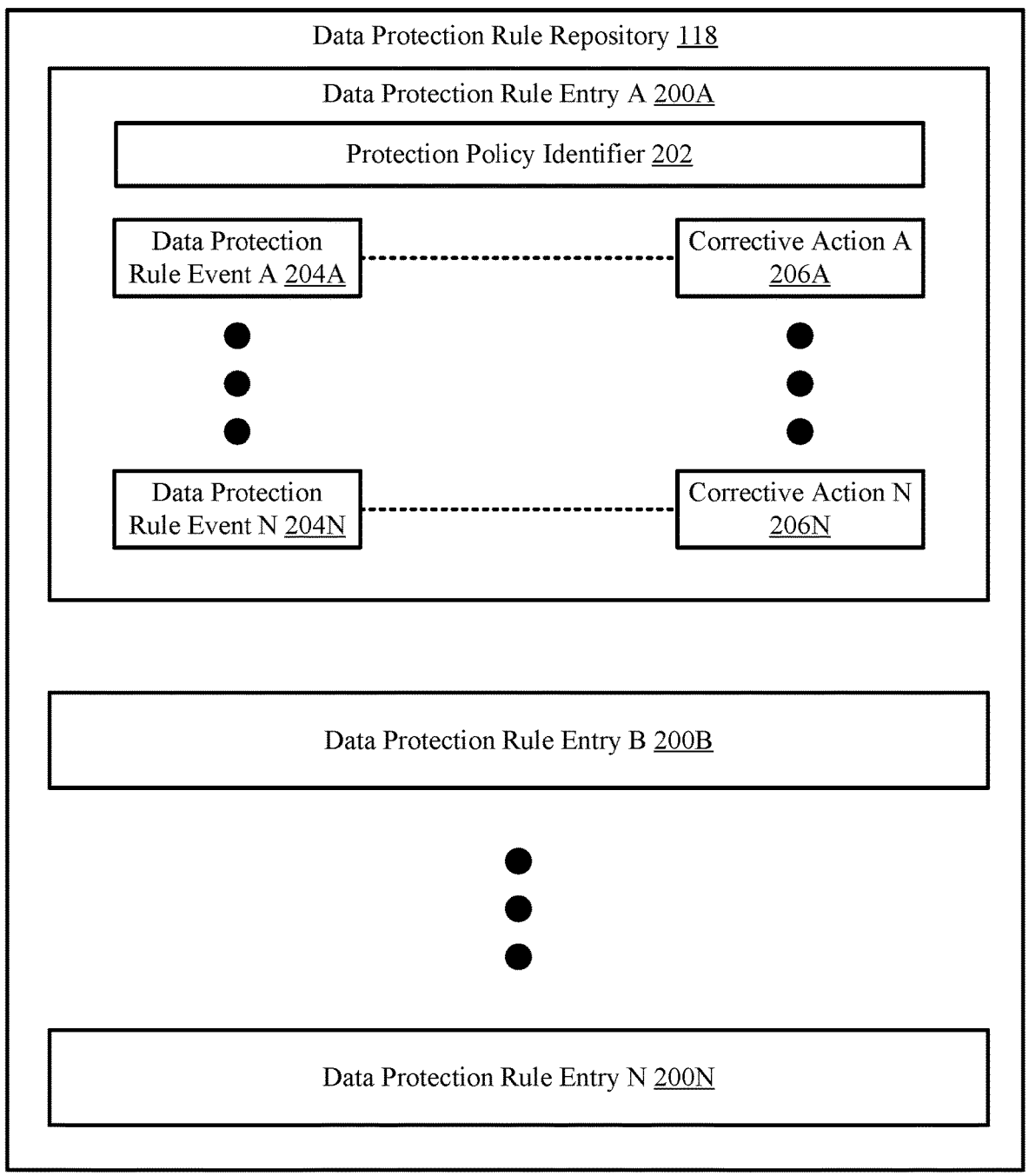
FIG. 2 shows a diagram of a data protection rule repository in accordance with one or more embodiments of the invention.

FIG. 2 shows a diagram of a data protection rule repository in accordance with one or more embodiments of the invention. The data protection rule repository (118) may be an embodiment of the data protection rule repository (118, FIG. 1F) discussed above. The data protection rule repository (118) may include one or more data protection rule entries, e.g., data protection rule entry A (200A), data protection rule entry B (200B), and data protection rule entry N (200N). Each data protection policy rule entry (e.g., 200A) may include a protection policy identifier (202) associated with the protection policy used to generate the data protection policy rule entry (e.g., 200A) and one or more data protection rule events, e.g., data protection rule event A (204A) and data protection rule event N (204N). Each data protection rule entry (e.g., 200A) may also include one or more corrective actions, e.g., corrective action A (206A) and corrective action N (206N). Each data protection rule event (e.g., data protection rule event A (204A)) is associated with a corrective action (e.g., correction action A (206A)). A data protection rule event (e.g., 204A) may include any event associated with the performance of data protection services without departing from the invention. A data protection rule event (e.g., 204A) may include, for example, central processing unit (CPU) utilization of a host associated with a VM exceeding a threshold. A corrective action (e.g., 206A) may include any action performed by one or more components of the system of FIG. 1A that may improve the performance of data protection services associated with a data protection rule event without departing from the invention. A corrective action (e.g., 206A) may include for example, adding an additional storage device to store VM backups. If monitoring information obtained from a monitoring engine indicates that a data protection rule event (e.g., 204A) occurs, the data protection manager (100, FIG. 1A) may initiate the performance of the associated corrective action (e.g., 206A) using the information included in the data protection rule repository (118). Additionally, the data protection manager (100, FIG. 1A) may identify components of the system to efficiently perform the corrective action based on infrastructure information included in the monitoring information.

The following section describes further examples of data protection rule events associated corrective actions. The data protection rule events and associated corrective actions may include different, fewer, and/or additional data protection rule events and corrective actions without departing from the invention.

A first data protection rule event may be if a processor of the VM data manager (e.g., 130, FIG. 1D) is consistently utilized beyond 80-90% of total utilization. A first corrective action associated with the first data protection rule event may be to either scale-up (e.g., dynamic hot-add an additional processor(s) during next run) or scale-out (e.g., add another VM data manager (e.g., 130, FIG. 1D)) computing resources based on underlying infrastructure utilization.

A second data protection rule event may be if 80% of network bandwidth is consistently utilized by a VM data manager (e.g., 130, FIG. 1D). A second corrective action associated with the second data protection rule event may be to normalize the concurrency across multiple VM data managers backing up VMs based on a single protection policy to improve Quality of Service (QoS) across multiple VM data managers.

A third data protection rule event may be if IOPS (input/output operations per second) of storages of hosts (e.g., 122A, FIG. 1B) exceed a 70% threshold consistently during the performance of data protection services. A third corrective action associated with the third data protection rule event may be to notify the data protection manager (100, FIG. 1A) and/or the scheduler (160, FIG. 1A) to add additional IOPS capabilities or distribute VMs across other and/or additional storages. Additionally, a fourth corrective action associated with the third data protection rule event may be that the VM data manager (e.g., 130, FIG. 1D) may be throttled to prevent storage congestion.

Figure 3A:
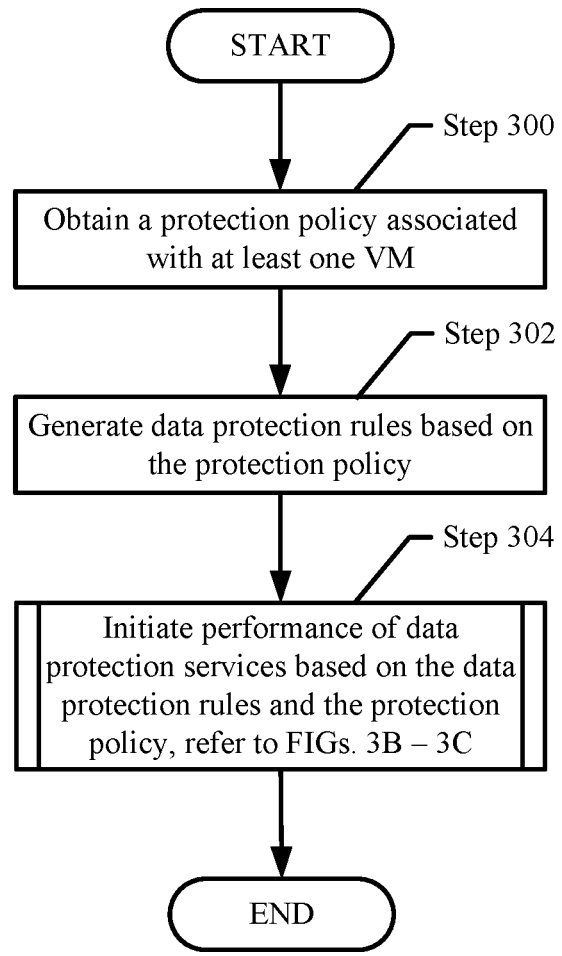
FIG. 3A shows a flowchart of a method of generating data protection rules in accordance with one or more embodiments of the invention.

FIG. 3A shows a flowchart of a method of generating data protection rules in accordance with one or more embodiments of the invention. The method shown in FIG. 3A may be performed by, for example, the data protection manager (100, FIG. 1A). Other components of the system illustrated in FIG. 1A may perform all or a portion of the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a protection policy associated with at least one VM is obtained. In one or more embodiments of the invention, the protection policy is obtained from a user of the system. A user of the system may send a message to the data protection manager. The message may include the protection policy. The message may also include the VM identifier of the at least one VM associated with the protection policy. The message may include other and/or additional information without departing from the invention. The protection policy associated with at least one VM via other and/or additional methods without departing from the invention.

In step 302, data protection rules are generated based on the protection policy. In one or more embodiments of the invention, the rule engine of the data protection manager generates data protection rules based on the protection policy. As discussed above, the protection policy may include requirements associated with the performance of data protection services for the VM. The rule engine of the data protection manager may include one or more data protection rule events, which the occurrence of such events may result in, or lead to, the requirements of the protection policy to not be met. The rule engine may also identify corrective actions using scheduling information obtained from a scheduler that may prevent and/or mitigate the failure of meeting the protection policy requirements and associated the corrective actions with the data protection rule events. The data protection rules may be generated based on the protection policy via other and/or additional methods without departing from the invention.

For example, a protection policy information may specify that backups of a VM are to be stored in a storage of the storages. The rule agent of the data protection manager may include a data protection rule event in the data protection rules that includes the storage of the storages exceeding ninety percent capacity. The rule agent of the data protection manager may include a corrective action in the data protection rules that includes adding an additional storage device to the storage of the storages. The rule engine of the data protection manager may associated the aforementioned data protection rule event and corrective action in the data protection rules.

In step 304, the performance of data protection services based on the data protection rules and the protection policy is initiated. The VM data manager orchestrator of the data protection manager may send one or more data protection requests to a VM data manager associated with the VM. In response to receiving the one or more data protection requests, the VM data manager may perform the data protection services based on the data protection rules and protection policy. The performance of the data protection services based on the data protection rules and the protection policy may be initiated via other and/or additional methods without departing from the invention. For additional information regarding initiating the performance of data protection services based on the data protection rules and the data protection policy, refer to FIGS. 3B-3C.

The method may end following step 304.

Figure 3B:
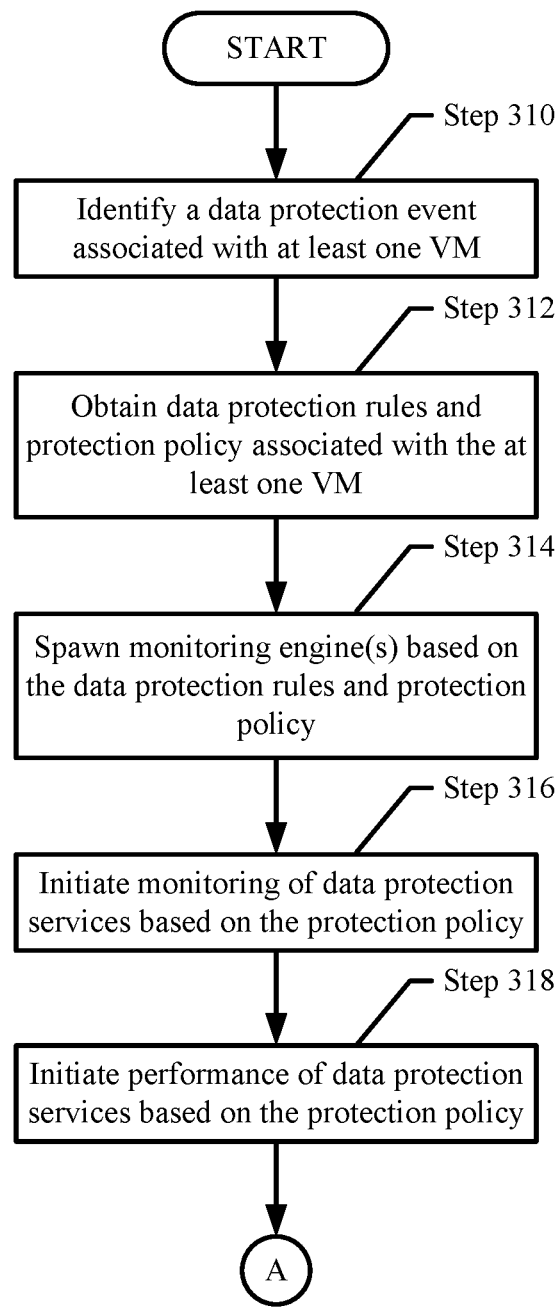
FIGS. 3B-3C show flowcharts of a method of managing the performance of data protection services in accordance with one or more embodiments of the invention.
Figure 3C:
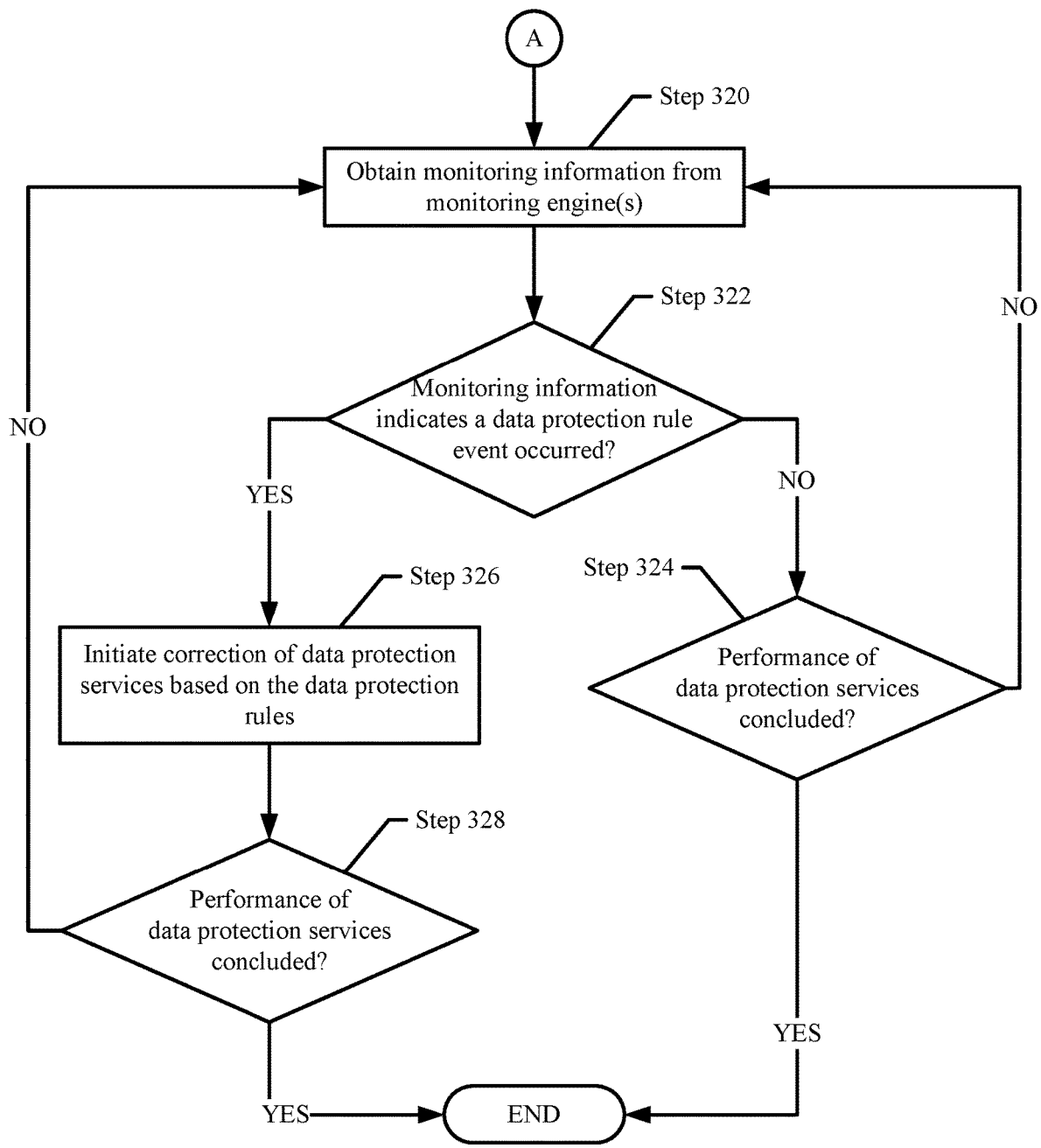

FIGS. 3B-3C show flowcharts of a method of managing the performance of data protection services in accordance with one or more embodiments of the invention. The method shown in FIGS. 3B-3C may be performed by, for example, the data protection manager (100, FIG. 1A). Other components of the system illustrated in FIG. 1A may perform all or a portion of the method of FIGS. 3B-3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3B, in step 310, a data protection event associated with at least once VM is identified. In one or more embodiments of the invention, a message is obtained from a user of the system. The message may include a request to perform data protection services for at least one VM. The message may include the VM identifier of the at least one VM associated with the request. The data protection manager may identify obtaining the message as the data protection event. The data protection event associated with the at least one VM may be identified via other and/or additional methods without departing from the invention.

In one or more embodiments of the invention, a protection policy may indicate that data protection services are to be performed for at least one VM. The policy engine of the data protection manager may monitor protection policies. As discussed above, protection policies may include schedules for performing data protection services for VMs. The data protection manager may identify identifying the point in time to perform data protection services for the at least one VM based on a protection policy as the data protection event. The data protection event associated with the at least one VM may be identified via other and/or additional methods without departing from the invention.

In step 312, data protection rules and a protection policy associated with the at least one VM are obtained. In one or more embodiments of the invention, the data protection rules and protection policy using a VM identifier and a protection policy identifier. As discussed above, the protection policies may include the VM identifiers of the VMs associated with the protection policies and data protection rule entries of the data protection rule repository may include protection policy identifiers of protection policies associated with the data protection rule entries. The data protection manager may identify and obtain a protection policy that includes the VM identifier obtained or identified in step 310. The data protection manager may identify and obtain a data protection rule entry that includes the protection policy identifier of the obtained protection policy. The data protection rules and protection policy associated with the at least one VM may be obtained via other and/or additional methods without departing from the invention.

In step 314, at least one monitoring engine is spawned based on the data protection rules and the protection policy. In one or more embodiments of the invention, the monitoring engine orchestrator of the data protection agent generates the at least one monitoring engine based on the data protection rules and the protection policy. The monitoring engine orchestrator may identify performance characteristics and components of the system associated with the data protection rules, protection policy, and the performance of the data protection services and instruct the monitoring engine to generate monitoring information associated with the performance characteristics and components. The monitoring engine orchestrator may send the at least one monitoring engine to a host of the data cluster associated with the at least one VM to deploy the at least one monitoring engine, and the host may instantiate the at least one monitoring engine. The monitoring engine orchestrator may also spawn the at least one monitoring engine from an existing monitoring engine image and instantiate the at least one monitoring engine on the host of the data cluster. The at least one monitoring engine may be generated based on the data protection rules and the protection policy via other and/or additional methods without departing from the invention.

In step 316, monitoring of the data protection services is initiated. In one or more embodiments of the invention, the monitoring engine orchestrator of the data protection manager sends a message to the host that includes the at least one monitoring engine. The message may include a request to execute the at least one monitoring engine. In response to obtaining the request, the host may execute the at least one monitoring engine and may begin the monitoring of the performance of the data protection services. Additionally, the monitoring engine itself may initiate the monitoring of data protection services when the monitoring engine is spawned without departing from the invention. Monitoring of the data protection services may be initiated via other and/or additional methods without departing from the invention.

In step 318, the performance of the data protection services based on the protection policy is initiated. In one or more embodiments of the invention, the VM data manager orchestrator of the data protection manager sends at least one message to the VM data manager associated with the at least one VM. The at least one message may include one or more data protection requests to perform data protection services to the at least one VM. Additionally, the message may include a request to initiate the monitoring of the performance of data protection services by the VM data manager by the resource monitor and the monitoring engine(s) based on the rules specified in the protection policy. In response to obtaining the at least one messages, the VM data manager associated with the VM may perform the data protection services and the resource monitor and the monitoring engine may monitor the performance of the data protection services by the VM data manager (e.g., generate monitoring information that includes performance characteristics of the VM data manager) based on the rules specified by the protection policy. The performance of the data protection services based on the protection policy may be initiated via other and/or additional methods without departing from the invention.

Turning to FIG. 3C, in step 320, monitoring information is obtained from the at least one monitoring engine. In one or more embodiments of the invention, the at least one monitoring engine sends one or more messages to the data protection manager. The at least one message may include monitoring information. As discussed above, the at least one monitoring engine may generate monitoring information associated with the performance of the data protection services. The at least one monitoring engine may periodically send monitoring information to the data protection manager during the performance of data protection services and/or the monitoring engine may send monitoring information to the data protection manager in response to a request obtained from the data protection manager. Monitoring information may be obtained from the at least one monitoring engine via other and/or additional methods without departing from the invention.

In step 322, a determination is made as to whether the monitoring information indicates a data protection rule event has occurred. In one or more embodiments of the invention, the monitoring information indicates whether a data protection rule event has occurred. The analytical engine of the data protection manager may compare the obtained monitoring information with the data protection rule events included in the data protection rules. If the monitoring information matches a data protection rule event, then the analytical engine of the data protection manager may determine that the monitoring information indicates that a data protection rule event has occurred. If the monitoring information does not match a data protection rule event, then the analytical engine of the data protection manager may determine that the monitoring information does not indicate that a data protection rule event has occurred. The determination as to whether the monitoring information indicates a data protection rule event has occurred may be determined via other and/or additional methods without departing from the invention.

If it is determined that the monitoring information indicates that a data protection rule event has occurred, then the method may proceed to step 326. If it is determined that the monitoring information does not indicate that a data protection rule event has occurred, then the method may proceed to step 324.

In step 324, a determination is made as to whether the performance of the data protection services has concluded. In one or more embodiments of the invention, the VM data manager sends a confirmation message to the data protection manager when the data protection services have concluded. The message may include confirmation that the data protection services have concluded. The message may specify the data protection services associated with the confirmation message. If the data protection manager has obtained the confirmation message, then the data protection manager may determine that the data protection services have concluded. If the data protection manager has not obtained the confirmation message, then the data protection manager may determine that the data protection services have not concluded. The determination as to whether the performance of the data protection services has concluded may be determined via other and/or additional methods without departing from the invention.

If it is determined that the performance of the data protection services has concluded, then the method may end following step 324. If it is determined that the performance of the data protection services has not concluded, then the method may proceed to step 326.

In step 326, correction of the data protection services is initiated based on the data protection rules. In one or more embodiments of the invention, the analytical engine of the data protection manager sends a request to perform a corrective action of the data protection rules to initiate the correction of the data protection services. The analytical engine of the data protection services may identify the corrective action associated with the data protection rule event of step 324 using the data protection rules. Additionally, the analytical engine may identify components of the system that are available and that may perform the corrective action efficiently to perform the corrective action using the infrastructure information included in the monitoring information The analytical engine may send a request to perform the corrective action that specifies the identified components to perform the corrective action to the at least one monitoring engine. In response to obtaining the request, the at least one monitoring engine may perform the corrective action and/or initiate the performance of the corrective action by specified components (e.g., scheduler, VM data manager, host, storages, etc.). Correction of the data protection services may be initiated based on the data protection rules via other and/or additional methods without departing from the invention.

In step 328, a determination is made as to whether the performance of the data protection services has concluded. In one or more embodiments of the invention, the VM data manager sends a confirmation message to the data protection manager when the data protection services have concluded. The message may include confirmation that the data protection services have concluded. The message may specify the data protection services associated with the confirmation message. If the data protection manager has obtained the confirmation message, then the data protection manager may determine that the data protection services have concluded. If the data protection manager has not obtained the confirmation message, then the data protection manager may determine that the data protection services have not concluded. The determination as to whether the performance of the data protection services has concluded may be determined via other and/or additional methods without departing from the invention.

If it is determined that the performance of the data protection services has concluded, then the method may end following step 328. If it is determined that the performance of the data protection services has not concluded, then the method may proceed to step 320.

EXAMPLE

Figure 4A:
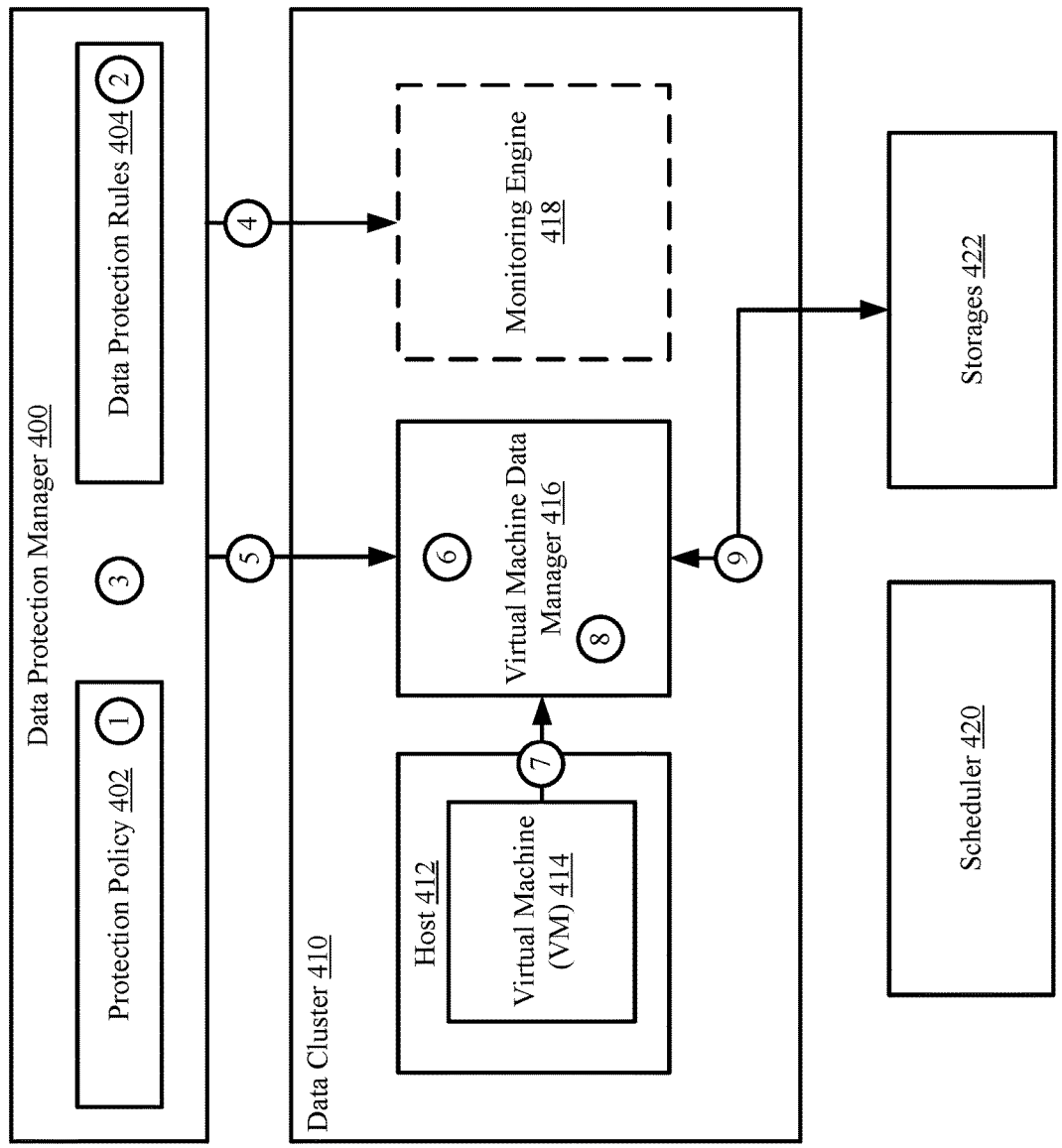
FIGS. 4A-4B show diagrams of the operation of an example system over time in accordance with one or more embodiments of the invention.
Figure 4B:
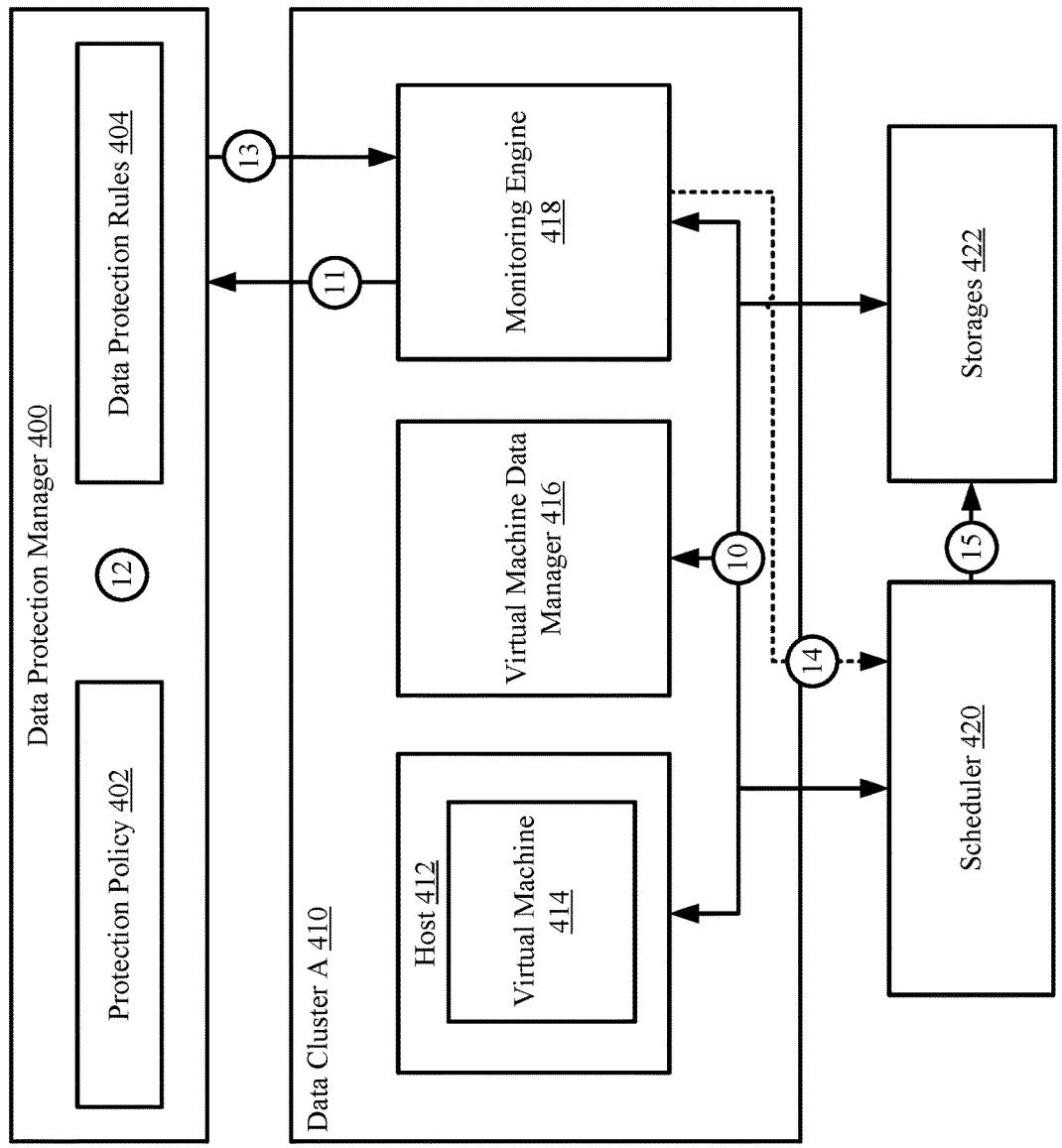

The following section describes the operation of an example system over time. FIGS. 4A-4B show diagrams of the operation of the example system over time in accordance with one or more embodiments of the invention. The examples are not intended to limit the invention. The example system depicted in FIGS. 4A-4B include fewer components than the system of FIG. 1A for the sake of brevity. Turning to FIG. 4A, consider a scenario in which a data protection manager is providing data protection management services for virtual machines executing on a host of a data cluster.

The example system depicted in FIG. 4A includes a data protection manager (400), a data cluster (410), a scheduler (420), and storages (422). The data cluster (410) includes a host (412) and a virtual machine data manager (416). The host (412) includes a virtual machine (414) executing on the host (412).

At a first point in time, the data protection manager (400) obtains a protection policy (402) associated with the virtual machine (VM) (414) from a user of the system [1]. As discussed above, the protection policy (402) includes requirements regarding the performance of data protection services for the VM (414). After obtaining the protection policy (402), the data protection manager (400) generates data protection rules (404) using the protection policy (402). The data protection rules (404) include a data protection rule event and an associated corrective action. The data protection rule event includes a storage of the storages (422) scheduled to store backups of the VM (414) exceeding 80% storage capacity. The corrective action associated with the data protection rule event may include adding another storage of the storages to store additional backups of the VM (414). The data protection rules (404) may include other and/or additional data protection rule events and corrective actions without departing from the invention.

Following the generation of the data protection rules (404), the data protection manager (400) identifies a data protection event associated with the VM (414) [3]. The data protection event may indicate that a backup of the VM (414) is to be generated once a day. In response to identifying the data protection event, the data protection manager (400) generates a monitoring engine (418) and deploys the monitoring engine (418) in the data cluster (410), wherein the monitoring engine executes on another host (not shown) of the data cluster (410). The monitoring engine (418) is programmed to monitor the performance of the data protection services as discussed above. After deploying the monitoring engine (418) to the data cluster (410), the data protection manager (400) sends a message to the virtual machine data manager (416) [5]. The message may include a request to generate a backup of the VM (414) once a day. In response to obtaining the request, the virtual machine data manager (416) obtains VM data from the VM (414) and generates a backup of the VM (414) [7]. During the generation of the backup, the resource monitor (not shown) of the virtual machine data manager (416) generates first portion of monitoring information associated with the performance of the data protection services by the virtual machine data manager (416). Then, the virtual machine data manager (416) sends the backup to the storages (422) where the backup is stored [9].

Turning to FIG. 4B, after the backup is stored in the storages (422), the monitoring engine (418) generates and obtains monitoring information from the host (412), the virtual machine data manager (416) (i.e., the first portion of the monitoring information), the scheduler (420), and the storages (422) [1(0]. The monitoring engine (418) then sends the monitoring information to the data protection manager (400) [11]. After obtaining the monitoring information from the monitoring engine (418), the data protection manager (400) determines that the storage used to store the backup now exceeds 80% storage capacity, which is a data protection rule event, and identifies the associated corrective action and the components to perform the corrective action (i.e., an additional storage of the storages (422) based on the monitoring information [12]. The data protection manager (400) then sends a request to add another storage to store backups of the VM (414) to the monitoring engine (418) based on the data protection rules (404) [13]. After obtaining the request, the monitoring engine (418) sends another request to the scheduler (420) to add the other storage of the storages (422) to store backups of the VM (414) generated in the future [14]. In response to obtaining the request, the scheduler (420) allocates a second storage of the storages (422) to store subsequent backups of the VM (414) [15].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing data protection services for virtual machines in a system. Embodiments of the invention relate to generating data protection rules based on protection policies associated with virtual machines and deploying monitoring engines that generate monitoring information associated with the performance of data protection services for virtual machines. A data protection manager may use the data protection rules and the monitoring information to identify data protection rule events associated with the performance of data protection services for virtual machines. The data protection manager may initiate the performance of corrective actions based on the data protection rule events using the data protection rules. This may enable the data protection manager to efficiently and proactively manage the performance of data protection services for virtual machines, improve the reliability of the data protection services, mitigate data loss, and reduce manual intervention.

Thus, embodiments of the invention may address the problem of inefficient use of computing resources to protect virtual machines in a system. This problem arises due to the technological nature of the environment in which the virtual machines are hosted.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:
1. A system for managing data protection of virtual machines hosted by hosts of data clusters, comprising:
   storages; and
   a data protection manager programmed to:
      identify a data protection event associated with at least one virtual machine (VM) of a data cluster of the data clusters;

obtain, in response the data protection event, data protection rules and a protection policy associated with the at least one VM;

based on the data protection rules and a protection policy associated with the at least one VM:

spawn, by a monitoring engine orchestrator of the data protection manager, at least one monitoring engine to the data cluster, wherein the monitoring engine monitors data protection services after it is spawned;

initiate performance of the data protection services for the at least one VM using a first storage of the storages;

obtain, after the spawning, monitoring information from the at least one monitoring engine;

make a determination that a data protection rule event of the data protection rule events occurred using the monitoring information, wherein the data protection rule events comprise:

utilization of a processor associated with the VM exceeding a threshold, network bandwidth associated with a VM data manager exceeding a threshold, and input/output operations per second (IOPS) of the storages exceed a threshold; and in response to the determination:

initiate the performance of a corrective action of corrective actions based on the data protection rules using a second storage of the storages.

2. The system of claim 1, wherein making the determination that the data protection rule event of the data protection rule events occurred using the monitoring information comprises;

identifying, based on the monitoring information and the data protection rules, the occurrence of the data protection rule event;

identifying, based on the data protection rules, the corrective action associated with the data protection rule event using the data protection rules; and identifying, based on infrastructure information, the second storage to perform at least a portion of the corrective action.

3. The system of claim 1, wherein deploying the at least one monitoring engine comprises:

generating the at least one monitoring engine;

sending the monitoring engine to the data cluster; and initiating monitoring the data protection services by the at least one monitoring engine.

4. The system of claim 1, wherein the data protection manager is further programmed to:

before identifying the data protection event:

obtain a protection policy associated with the VM; and generate the data protection rules based on the protection policy.

5. The system of claim 4, wherein the data protection rules comprise:

data protection rule events; and corrective actions.

6. The system of claim 5, wherein the data protection rules specify that the data protection rule event is associated with the corrective action.

7. The system of claim 2, wherein the monitoring the data protection services comprises:

generating, by the at least one monitoring engine, the monitoring information associated with the performance of the data protection services; and sending, by the at least one monitoring engine, the monitoring information to the data protection manager.

8. The system of claim 7, wherein monitoring information specifies whether a data protection rule event has occurred and comprises the infrastructure information.

9. A method for managing data protection of virtual machines hosted by hosts of data clusters, comprising:

identifying a data protection event associated with at least one virtual machine (VM) of a data cluster of the data clusters;

obtaining, in response the data protection event, data protection rules and a protection policy associated with the at least one VM;

based on the data protection rules and a protection policy associated with the at least one VM:

spawning, by a monitoring engine orchestrator of the data protection manager, at least one monitoring engine to the data cluster, wherein the monitoring engine monitors data protection services after it is spawned;

initiating performance of the data protection services for the at least one VM using a first storage of the storages;

obtaining, after the spawning, monitoring information from the at least one monitoring engine;

making a determination that a data protection rule event of the data protection rule events occurred using the monitoring information, wherein the data protection rule events comprise:

utilization of a processor associated with the VM exceeding a threshold, network bandwidth associated with a VM data manager exceeding a threshold, and input/output operations per second (IOPS) of the storages exceed a threshold; and in response to the determination:

initiating the performance of a corrective action of corrective actions based on the data protection rules using a second storage of the storages.

10. The method of claim 9, wherein making the determination that a data protection rule event of the data protection rule events occurred using the monitoring information comprises:

identifying, based on the monitoring information and the data protection rules, the occurrence of the data protection rule event;

identifying, based on the data protection rules, the corrective action associated with the data protection rule event using the data protection rules; and identifying, based on infrastructure information, the second storage to perform at least a portion of the corrective action.

11. The method of claim 9, wherein deploying the at least one monitoring engine comprises:

generating the at least one monitoring engine;

sending the monitoring engine to the data cluster; and initiating monitoring the data protection services by the at least one monitoring engine.

12. The method of claim 9, further comprising:

before identifying the data protection event:

obtaining a protection policy associated with the VM; and generating the data protection rules based on the protection policy.

13. The method of claim 12, wherein the data protection rules comprise:
  data protection rule events; and
  corrective actions.

14. The method of claim 13, wherein the data protection rules specify that the data protection rule event is associated with the corrective action.

15. The method of claim 10, wherein the monitoring the data protection services comprises:
  generating, by the at least one monitoring engine, the monitoring information associated with the performance of the data protection services; and
  sending, by the at least one monitoring engine, the monitoring information to the data protection manager.

16. The method of claim 15, wherein monitoring information specifies whether a data protection rule event has occurred and comprises the infrastructure information.

17. A non-transitory computer readable medium comprising computer readable program code, which when executed by a computer processor enables the computer processor to perform a method for managing data protection of virtual machines hosted by hosts of data clusters, wherein the method comprises:
  identifying a data protection event associated with at least one virtual machine (VM) of a data cluster of the data clusters;
  obtaining, in response the data protection event, data protection rules and a protection policy associated with the at least one VM;
  based on the data protection rules and a protection policy associated with the at least one VM:
    spawning, by a monitoring engine orchestrator of the data protection manager, at least one monitoring engine to the data cluster, wherein the monitoring engine monitors data protection services after it is spawned;
    initiating performance of the data protection services for the at least one VM using a first storage of the storages;
    obtaining, after the spawning, monitoring information from the at least one monitoring engine;
    making a determination that a data protection rule event of the data protection rule events occurred using the monitoring information, wherein the data protection rule events comprise:
      utilization of a processor associated with the VM exceeding a threshold,
      network bandwidth associated with a VM data manager exceeding a threshold, and
      input/output operations per second (IOPS) of the storages exceed a threshold; and
    in response to the determination:
      initiating the performance of a corrective action of corrective actions based on the data protection rules using a second storage of the storages.

18. The non-transitory computer readable medium of claim 17, wherein making the determination that a data protection rule event of the data protection rule events occurred using the monitoring information comprises;
  identifying, based on the monitoring information and the data protection rules, the occurrence of the data protection rule event;
  identifying, based on the data protection rules, the corrective action associated with the data protection rule event using the data protection rules; and
  identifying, based on infrastructure information, the second storage to perform at least a portion of the corrective action.

19. The non-transitory computer readable medium of claim 17, wherein deploying the at least one monitoring engine comprises:
  generating the at least one monitoring engine;
  sending the monitoring engine to the data cluster; and
  initiating monitoring the data protection services by the at least one monitoring engine.

20. The non-transitory computer readable medium of claim 17, wherein the method further comprising:
  before identifying the data protection event:
  obtaining a protection policy associated with the VM; and
  generating the data protection rules based on the protection policy.

* * * * *